Feb. 11, 1969  D. SEILING  3,426,911
UTILITY HOLDING DEVICE
Filed April 1, 1966
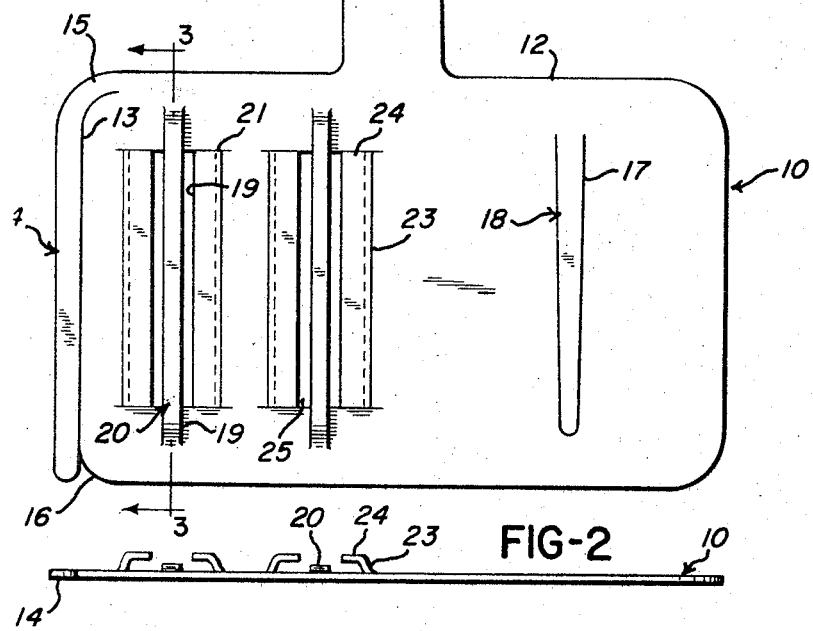
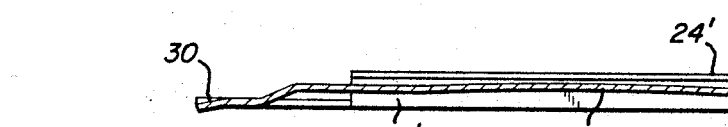
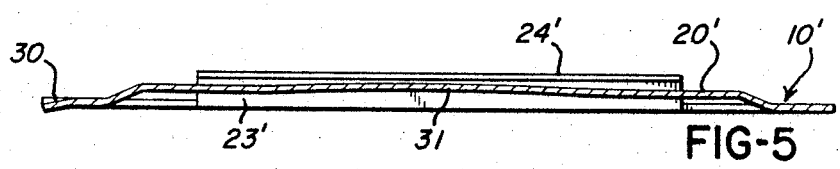
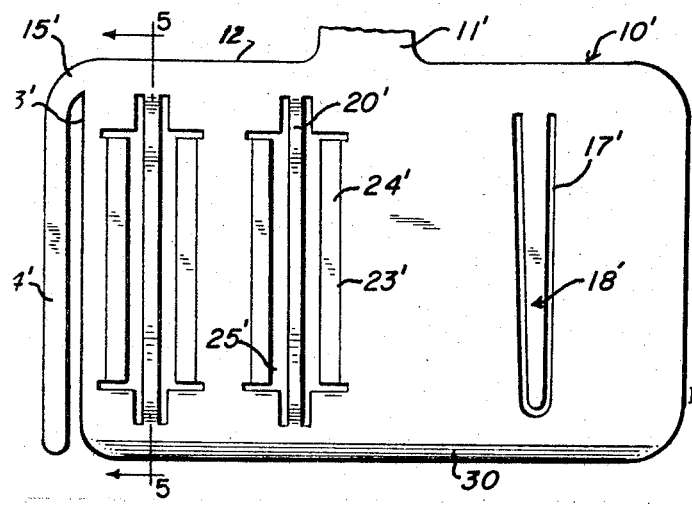
INVENTOR.
DON SEILING
BY Jerome P. Bloom
ATTORNEY United States Patent Office
3,426,911
Patented Feb. 11, 1969

3,426,911
UTILITY HOLDING DEVICE
Don Seiling, 128 Grafton Ave., Dayton, Ohio 45406
Filed Apr. 1, 1966, Ser. No. 539,402
U.S. Cl. 211—13
Int. Cl. A47f 5/08, 7/00
9 Claims

ABSTRACT OF THE DISCLOSURE

A utility holding device mounting to a sun visor of an automobile or other object of like configuration incorporating mounting and holding means, integral portions thereof being especially adapted to store articles of varying description and the device being so formed and positioned as to facilitate the storge and removal of such articles.

---

This invention relates to a uniquely designed plate device for holding sundry items of various shape and form. Preferred embodiments have particular advantage when used as an attachment to the sun visor of an automobile and will be so described. However, it will become obvious from the present disclosure that neither the form of the embodiment of the invention nor the nature of its application need be so limited.

A primary object of the invention is to provide a plate-like utility device constituting a holder accommodating a number of useful articles of different configuration which is simple and economical to fabricate, most efficient and satisfactory in use, and adaptable to a wide variety of applications.

Another object of the invention is to provide a unique, unitarily designed holding device which is capable of both receiving and retaining various articles of widely different configuration.

A further object of the invention is to provide a holding device as here described which can be readily and cheaply fabricated in a single forming operation.

An additional object of the invention is to provide a plate-like holder adapted to serve as a bank for coins, tokens and like articles and, further, to simultaneously retain a number of completely different articles, such as glasses, stamps and other personal items.

A further object of the invention is to provide a unitarily designed holder for sundry articles, which holder has a simple plate-like pre-cut form.

Another object of the invention is to provide a holding device capable of simultaneously accommodating coins, tokens, glasses and other articles of widely differing size and configuration possessing the advantageous structural features, the inherent meritorious characteristics, and the means and mode of operation herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawings wherein are shown some but obviously not necessarily the only forms of embodiment of the invention:

FIG. 1 is a plan view of a preferred embodiment of the invention here described;

FIG. 2 is an end view of the holder shown in FIG. 1;

FIG. 3 is an enlarged sectional view taken on line 3—3 of FIG. 1;

FIG. 4 is a plan view of a further embodiment of the invention; and

FIG. 5 is a cross-sectional view taken on line 5—5 of FIG. 4.

Like parts are indicated by similar characters of reference throughout the several views.

In the drawings, FIGS. 1 to 3 show a multiple purpose holder which is particularly adapted for application to a sun visor of an automobile or like structure. This holder has a unitary plate-like configuration. It is preferably formed of metal or plastic. In the forming procedure there is produced a series of discontinuous cuts or separations, the purpose of which shall be further described.

The holding device includes a flat plate-like body 10 and, co-planar therewith, a finger-like portion 11 projecting perpendicular to and centrally from one edge 12. The body 10 is preferably formed in a single stamping operation to produce the aforementioned series of discontinuous cuts or separations. One cut 13 is so provided to position adjacent and generally parallel to one side of the body 10, producing a finger-like element 14 anchored at one end to the edge portion 12. The connected extremity of element 14 terminates in an arcuate section 15 forming one corner of the body 10 and merging with one end of the edge portion 12. The periphery of the body 10 adjacent the relatively free extremity of the finger 14 is cut back to form an arcuate edge portion 16. The portion 16 facilitates a flexed displacement of the finger 14. Also formed in the body 10 is a second discontinuous cut 17. This cut is within the boundaries of body 10 and produces a finger-like portion 18 parallel to, adjacent and spaced from the side of the body which is remote from the finger 14. The finger 18 may also be flexed in displacement from the general plane of the main body.

Whether made of plastic or metal, the material of which the plate is formed is such that the partially severed portions are endowed with an inherent resiliency on a relative displacement from their normal positions within the framework of the body 10.

In the stamping procedure there is also a forming operation. Arranged in a central portion of the plate most adjacent the finger 14 are a series of further discontinuous cuts 19. The cuts 19 are parallel and in closely spaced pairs, extending generally perpendicular to the edge 12. Defined between each pair is a biased band portion 20. The outer side of each cut 19 in each pair is intersected by a pair of longitudinally spaced short cuts 21 generally perpendicular thereto. The net effect thereof is a three sided cut producing a rectangular portion to each side of each band 20.

In the process of stamping, these rectangular portions are displaced outwardly of one face of the body 10 to produce mating parallel guides to either side of a band 20. The guides of each pair include perpendicularly projecting almost parallel side portions 23 and right angled lip portions 24, the latter being co-planar and to either side of the intermediate band 20. There is thus produced pairs of cooperating transversely spaced guides which form between the adjacent lips thereof a slot-like opening 25. In underlying relation to each slot is a band 20 which is slightly elevated from the body 10.

In the example illustrated there are two pair of such guides, open to either end. Each pair constitutes a banking device for retaining coins, tokens or like articles, slipped in from one open end to have a three surface retention contact with the overlying lips 24 and the underlying band portion 20.

The device as described may be applied over the top surface of a sun visor of an automobile. The nature of the body is such that the tab 11 may be bent over the outer edge and then to the underside of the visor to thereby frictionally retain thereto the body 10. Of course, the material of the body will in any event be of a nature that this bending can occur without fracture.

As will be obvious, the finger element 18 may be readily lifted or bent to form, for example, a clip for paper articles as small as trading stamps. Further, to one side of the body 10 the finger 14 produces a tab which can be readily displaced to hold between it and the adjacent edge portion of the body produced by the cut 13 an article such as sun-glasses. Being at a remote side of the body, the ear piece of the glasses may be looped over the finger and frictionally held in a manner believed obvious.

In the process of the stamping operation, if preferred, there can be induced at this time a partial displacement of the finger elements from the main plane of the body 10. This will facilitate the application to the holder of a number of varied articles as contemplated by the invention.

Looking to FIGS. 4 and 5 of the drawings, one observes another modification of the invention as just described. In this instance the plate-like body is designated as 10' and has an outline generally similar to that just described, including a finger-like projection 11'. However, here, rather than knife-like cuts as indicated in the example of FIGS. 1 and 3, the separations are produced by broader cutting elements. In this manner there are achieved slots which define the displaceable portions of the holding device.

Therefore, in this embodiment there is a spaced separation of the finger 14' to one side of the body 10', except, of course, for its arcuate end which is anchored to and merges with the edge 12'. Also, the finger 18' generally central of the body 10' is defined on three sides by a discontinuous slot.

An added feature of this modification is the provision that the outermost edge portion 30 of the body 10 which is opposite the edge 12' is, with the exception of the finger portion 14', angularly depressed to lend strength. This also enables a firm adherence of the plate to a sun visor when applied as previously described. Also, in the forming of the bands 20', similarly to the previously described bands 20, the bands 20' have been given a central hump at 31. Due to the latter feature, there is less distance between the uppermost portion of the hump and the adjacent level of the lips 24' of the guides to either side of the band. In this way, there is produced an increased spring effect which has advantage in retention of some coins or tokens to the body 10.

It may be seen from the preceding that the unitarily formed plate structure of the invention is a bank for coins or like articles and simultaneously a device for simple and effective retention of other articles of various form. In respect to the bank aspect, the guides as formed in the plate structure produce uniquely effected mediums for holding coins, etc., while enabling their ready removal for use. It should be observed that in the displacement of any portion of the body which is formed by a discontinuous separation, whether a knife-like cut or slot, there is produced an inherent resiliency which enhances the ability of the portions to retain elements, irrespective of their thickness or lack thereof. The fact that trading stamps or other flimsy papers may be held by the finger 17 gives one some concept of the versatility of the device described.

While the invention embodiments have been illustrated and described with particular reference to their application to a sun visor of an automobile, it should be obvious that this is not the only object to which the invention devices may be applied. As a matter of fact, the invention offers a utility plate device which may be installed on any surface or attached to any medium which offers a base for its support.

It will be recognized that the invention devices are formed in a manner which indicates the utmost simplicity and economy of their fabrication.

Having thus described my invention, I claim:

1. A holding device for application to a sun visor of an automobile or object of like configuration comprising a laterally extended unitary plate structure incorporating a plurality of integrally connected holding means arranged in a relatively side-by-side relation, said plate having a flat underside portion arranged to lie in a generally flush abutment to one surface of a sun visor, said plate further having marginally projecting mounting means to engage over an edge of the visor and extend along an opposite surface thereof, the upper side of said plate structure which is outermost from said visor having vertically displaced overlying finger portions and at a level therebelow related surface portions along which coins or like articles may be slid to underlie said finger portions, said finger portions and related plate surface portions together providing for frictional retention of the coins in a manner to facilitate a ready release.

2. A holding device as in claim 1 characterized further by a longitudinally extended finger-like element connected integral with said plate structure in laterally spaced relation to said first-mentioned overlying finger portions, said plate structure having an opening therein substantially corresponding in size and configuration to said longitudinally extended finger, said longitudinally extended finger with the portions of said plate structure rimming said opening providing for frictional retention of a variety of articles having differing configurations.

3. A holding device as described in claim 1 characterized by a finger-like section connected integrally with one lateral extremity of said plate structure formed to provide for a secured engagement thereto or dependency therefrom of sundry articles.

4. A holding device as in claim 1 characterized by said overlying finger portions being disposed completely within the bounds of said plate structure, spaced from the periphery thereof and rimmed by edge portions of complementary openings in said plate structure.

5. A holding device as in claim 1 characterized by said plate structure having in addition to said overlying finger portions a longitudinally extended finger portion which is laterally spaced therefrom and disposed in the area of a complementary opening in said plate structure, said longitudinally extending finger being capable of being flexed and forming together with the portions of said plate structure defining said complementary opening a frictional retention means.

6. A utility device serving as a holder for sundry articles of various shape and form, and having particular advantage when used as an attachment to a sun visor of an automobile, comprising a substantially planar unitary plate structure having formed therein a plurality of discontinuous separations defining integrally formed holding means of different form and accommodation at least one of which includes means displaced from the plane of the plate structure and having an inherent resilience to be stressed by receiving said articles to apply thereto a frictional holding pressure, said one holding means including relatively adjacent spaced plate sections which are generally parallel and displaced outwardly from one face of said structure to produce guides including lip portions which are projected towards each other in a generally co-planar relation, a portion of the plate structure intermediate said lip portions being in a plane displaced outwardly from said one face of said underlying structure adjacent and slightly below said lip portions to form with said lip portions a three-surfaced retention device for coins or like elements.

7. A utility device as in claim 6 wherein said intermediate portion is humped intermediate its longitudinal extent to thereby afford a variable spring retention characteristic to the contained coins.

8. A holding device for application to a sun visor of an automobile or the like, comprising a unitary plate structure sufficiently broad to accommodate a plurality of holding means in a side-by-side relation and having a flat underside to lie flush against a surface of a sun visor, the upper side of said plate structure providing in a laterally spaced side-by-side relation a deflectable finger to grip inserted paper and like articles and at least one means to hold a row of coins, said last named means including portions raised above the said upper side of said plate structure beneath which coins are wedged by being slid along the plate surface to positions beneath said raised portions, said plate having disposed to project at one end thereof another finger portion adapted to hold other articles in a fixed position relative said plate structure, and still other finger means marginally projected from said plate structure to engage over an edge of the sun visor and lie against the opposite surface thereof, said last named finger means forming a mount by which the holding device may be releasably held to the sun visor.

9. A utility device serving as a holder for sundry articles of various shape and form, and having particular advantage when used as an attachment to a sun visor of an automobile, comprising a substantially planar unitary plate structure having formed therein a plurality of discontinuous separations defining integrally formed holding means of different form and accommodation at least one of which includes means displaced from the plane of the plate structure and having an inherent resilience to be stressed by receiving said articles to apply thereto a frictional holding pressure, said plate-like structure having a generally rectangular configuration, an underside thereof being adapted to lie flush against the surface of a sun visor or the like with said displaced means projecting from the opposite side, one longitudinal edge of said structure having means projecting therefrom for engagement thereof to the sun visor, another one of said holding means including a finger completely contained within the margins of the structure and displaceable for frictional gripping of articles inserted thereunder, said holding means further included a suspension hook formed at one end of the plate structure by making one of said separations in a substantially parallel adjacent relation to said one end and extending it through the other longitudinal edge of the structure, said displaced means including projected laterally spaced guides and an intermediate projected band, articles inserted between said guides and reacting upon said band being frictionally gripped.

References Cited
UNITED STATES PATENTS

| | | |
|---|---|---|
| 537,120 | 4/1895 | Lieb. |
| 1,542,182 | 6/1925 | Spaziante _____ 211—89 XR |
| 2,147,086 | 2/1939 | Bryan. |
| 2,881,926 | 4/1959 | Spence _____ 211—89 |

ROY D. FRAZIER, *Primary Examiner.*

J. FRANKLIN FOSS, *Assistant Examiner.*

U.S. Cl. X.R.

211—49, 89